United States Patent [19]

Barth et al.

[11] Patent Number: 4,955,712
[45] Date of Patent: Sep. 11, 1990

[54] MULTIFOCAL LENS

[75] Inventors: Rudolf Barth, Vierkirchen; Günther Guilino, Munich; Dieter Kalder, Mörfelden, all of Fed. Rep. of Germany

[73] Assignee: Optische Werke G. Rodenstock, Munich, Fed. Rep. of Germany

[21] Appl. No.: 380,781

[22] Filed: Jul. 18, 1989

Related U.S. Application Data

[63] Continuation of Ser. No. 876,855, filed as PCT DE85/00279 on Aug. 19, 1985, published as WO86/01309 on Feb. 27, 1986 abandoned.

[30] Foreign Application Priority Data

Aug. 17, 1984 [DE] Fed. Rep. of Germany ....... 3430334

[51] Int. Cl.⁵ .................................................. G02C 7/06
[52] U.S. Cl. ...................................... 351/169; 351/172
[58] Field of Search ................ 351/169, 172, 170, 171

[56] References Cited

U.S. PATENT DOCUMENTS 4,315,673  2/1982  Guilino et al. ........................ 351/169
4,461,550  7/1984  Legendre ............................... 351/169
4,592,630  6/1986  Okazaki ................................. 351/169

FOREIGN PATENT DOCUMENTS 56-32121  4/1981  Japan .................................... 351/169

Primary Examiner—Bruce Y. Arnold
Assistant Examiner—Terry S. Callaghan
Attorney, Agent, or Firm—Kalish & Gilster

[57] ABSTRACT

A multifocal lens is described with a main lens designed for distance vision and a segment designed for near vision.

The lens in accordance with the present invention is characterized by the fact that one surface of the segment consists of the progression area and the reading portion of a progressive surface.

In an advantageous further development the progressive surface whose progression area and reading portion form one surface of the segment is designed in such a way that its surface astigmatism is concentrated essentially in the distance portion.

8 Claims, 6 Drawing Sheets

| SAGITTA | | | | | | | X(MM) | RADII HORIZONTAL | | | | | | | |
|---|---|---|---|---|---|---|---|---|---|---|---|---|---|---|---|
| 28 | 24 | 20 | 16 | 12 | 8 | 4 | 0 | 0 | 4 | 8 | 12 | 16 | 20 | 24 | 28 |
| | | | | | | | Y(MM) | | | | | | | | |
| | 8.754 | 7.282 | 6.112 | 5.264 | 4.712 | 4.424 | 4.333 | 28 | | | | | | | |
| 9.212 | 7.505 | 6.060 | 4.915 | 4.085 | 3.550 | 3.261 | 3.171 | 24 | 88 | | | | | 76 | 88 |
| 8.148 | 6.463 | 5.039 | 3.913 | 3.098 | 2.571 | 2.286 | 2.198 | 20 | 89 | 81 | 66 | 55 | 55 | 62 | 76 | 88 |
| 7.292 | 5.623 | 4.214 | 3.102 | 2.297 | 1.776 | 1.494 | 1.406 | 16 | 90 | 82 | 67 | 58 | 56 | 62 | 75 | 88 |
| 6.640 | 4.980 | 3.581 | 2.477 | 1.678 | 1.161 | 0.880 | 0.793 | 12 | 91 | 83 | 68 | 59 | 57 | 63 | 75 | 89 |
| 6.184 | 4.529 | 3.136 | 2.036 | 1.239 | 0.723 | 0.442 | 0.354 | 8 | 91 | 83 | 69 | 59 | 57 | 62 | 75 | 89 |
| 5.914 | 4.263 | 2.874 | 1.777 | 0.981 | 0.462 | 0.178 | 0.089 | 4 | 91 | 83 | 69 | 59 | 57 | 63 | 75 | 88 |
| 5.829 | 4.184 | 2.803 | 1.710 | 0.910 | 0.384 | 0.092 | 0.000 | 0 | 90 | 82 | 69 | 60 | 58 | 63 | 74 | 87 |
| 5.938 | 4.303 | 2.937 | 1.850 | 1.044 | 0.500 | 0.192 | 0.093 | -4 | 87 | 81 | 69 | 61 | 59 | 64 | 74 | 85 |
| 6.259 | 4.636 | 3.288 | 2.209 | 1.392 | 0.825 | 0.492 | 0.383 | -8 | 81 | 77 | 69 | 63 | 62 | 65 | 73 | 79 |
| 6.819 | 5.194 | 3.850 | 2.771 | 1.943 | 1.358 | 1.009 | 0.893 | -12 | 73 | 72 | 69 | 67 | 66 | 68 | 71 | 73 |
| 7.637 | 5.994 | 4.636 | 3.545 | 2.706 | 2.112 | 1.758 | 1.639 | -16 | 69 | 69 | 69 | 69 | 69 | 69 | 69 | 69 |
| 8.729 | 7.057 | 5.676 | 4.568 | 3.716 | 3.113 | 2.753 | 2.633 | -20 | 68 | 68 | 68 | 69 | 69 | 69 | 68 | 68 |
| 10.108 | 8.399 | 6.989 | 5.858 | 4.989 | 4.375 | 4.008 | 3.885 | -24 | 67 | 67 | 67 | 68 | 68 | 68 | 67 | 67 |
| | 10.039 | 8.592 | 7.432 | 6.542 | 5.912 | 5.536 | 5.411 | -28 | 66 | 66 | 66 | 66 | 67 | 66 | 66 | 66 |
| | | | | | | | | | 64 | 64 | 65 | 65 | 65 | 65 | 64 | |

FIG. 2

MULTIFOCAL LENS

This application is based on International Application PCT/DE/00279 having International Filing Date of Aug. 19, 1985 and is a continuation of application Ser. No. 07/876,855, filed as PCT DE85/00279 on Aug. 19, 1985 published as WO86/01309 on Feb. 27, 1986, now abandoned.

BACKGROUND

The present invention relates to a multifocal lens, i.e., bifocal lens with a main lens designed for distance vision and a segment designed for near vision, wherein the near vision segment consists of a progression area and a reading portion of a progressive surface.

STATE OF THE ART

Multifocal lenses of the type having a main lens and a near vision segment, where the optical power has a certain constant value both in the main lens and in the segment, are generally known. These lenses do have the advantage that both the main lens used for distance vision and a near segment used for near vision are relatively large and largely free of aberration. But such multifocal lenses, which are also known as bifocal lenses, also have the disadvantage that the wearer still has to be able to accommodate to a certain extent if he, for example when working at a desk, wants to clearly see objects which are not only in reading distance but also objects which are further away at, for example, a distance of 1 m.

This disadvantage also occurs—albeit in a weaker form—with so-called trifocal lenses which in addition to the main lens and the reading portion designed for near vision also have an intermediate portion whose optical power is intended to support the wearer's limited accommodation capability for vision at intermediate distances.

To avoid the disadvantages listed above of bifocal and trifocal lenses, so-called progressive lenses have been proposed for a long time. These lenses have a surface whose power increases along an essentially vertical main meridian. Typically, progressive spectacle lenses have a distance portion in their upper area and a reading portion in their lower area and between these two a progression corridor in which the power increases from that of the distance portion to that of the reading portion. Ideally, both the distance portion and the reading portion should be as large as possible and the progressive corridor should permit uninterrupted vision for intermediate distances.

It has, however, been discovered that these demands cannot be realised in practice: Known progressive lenses have either a relatively large distance portion and a relatively large reading portion with the progressive zone being practically unsuitable for clear vision due to high distortion in the peripheral areas, or they represent a compromise solution where—if the progressive corridor permits more or less distortion-free vision at intermediate distances—the reading portion is so small that it is not possible to see even a DIN A4 sheet of paper without the head having to be moved as long as no loss in visual acuity is tolerated. Furthermore, due to an increase in astigmatism the distance portion is limited, particularly in the lateral lower rim areas.

Progressive lenses of the type first mentioned with a large distance portion and a large reading portion where the progressive corridor practically does not permit clear vision, are, for example, described in the GDR patent No. 71 210, while progressive lenses of the second type, in which the reading portion is relatively small, are described in U.S. Pat. Nos. 2,109,474, 2,878,271 and the DE OS Nos. 20 44 639, 23 36 708, 24 39 127, 30 16 935 and 31 47 952. All surfaces described in the foregoing references are based on the following concept:

In the upper part of the progressive corridor and also in a part of that area really designed as the distance portion, the surface focal power increases essentially from the lens center towards the lens rim while it decreases from the lens center towards the lens rim in the lower part of the progressive corridor and in the reading portion. As a result, the focal power increase is substantially lower in the rim area than on the main meridian, i.e. about in the lens center; in other words, the differences between distance portion and reading portion are reduced in the rim areas. Thanks to this design principle it is possible to distribute irritating astigmatism widely over the whole surface with peak values being "pushed out" into the lower, lateral areas. A disadvantage is, however, that the power decreases in the reading portion while at the same time astigmatism increases greatly. For example, the width of the reading portion—with a permissible power decrease in the reading portion of 1 D—in the vicinity of the so-called near reference point is only about 15 mm. As a result, with these known progressive lenses it is no longer possible, for example, to see a whole page of newspaper in one glance so that it becomes necessary to move the head while reading. Furthermore, with these known progressive lenses that part of the progressive corridor which is suitable for clear vision in the intermediate area is narrowed to a few millimeters due to the fast rising astigmatism. For this reason, the known progressive lenses require either a main meridian which winds according to the eye movement from distance to near or they must be tilted, i.e. fitted into the spectacle frame with a main meridian rotated through 6° to 10°. This requires exact edging of the lenses into the spectacle frame; if the edging is not exact, or if the "fit" of the frame changes, incompatibilities may easily arise.

A number of authors (reference is, for example, made to U.S. Pat. No. 2,878,721, column 1, line 55 ff) have expressed the assumption that for reasons of principle it is not possible to further improve lenses of the type discussed above, as a progressive spectacle lens with a progressive surface must as a matter of course have a certain astigmatism.

For this reason, it is proposed in European patent No. 39 284 to press or affix an additional segment into a progressive lens of the type described in detail above, which would have at least in part a constant optical power. In this way, the object should be achieved that a larger area than that of the known progressive surfaces would be largely free of aberration so that it would permit undisturbed near vision. But this proposal also has a number of disadvantages:

First, the segment which would be additionally fixed in is relatively small. Increasing the size of this segment is probably not possible as otherwise the overlap of the two surfaces, namely of the progressive main surface and the segment surface, would be too large. This is a consequence of using progressive surface with the basic concept as has been described above.

Above all, however, the lens described in European patent No. 39 284 shows a jump in power in that area which the spectacle wearer looks through when he views objects at intermediate distances. This is particularly irritating as it results in sudden changes in accommodation similar to those which occur with bifical or trifocal lenses when, for example, the wearer is working at a desk.

SUMMARY OF THE INVENTION

The object of the present invention is to describe a spectacle lens which not only has a large distance portion and a large reading portion, but which also permits uninterrupted vision at intermediate distances.

This object is solved in accordance with this invention by having as a base a multifocal lens in accordance with the invention and by designing this multifocal lens in such a way that the segment has a progressive surface.

It has been recognized in accordance with this invention that with a spectacle lens one surface of which has, for example, a spherical or toric shape, and where the second surface shows a progressive power increase, it is not possible to realise a large distance portion and a large near portion together with a progressive zone which can be used without reservations for orientating vision all at the same time. In the above, a large near vision zone is understood to be an area which permits the viewing of at least a sheet of DIN A3 paper without any head movements having to be made merely by moving the eyes. The progressive corridor should, at the same time, permit clear vision at least for those visual distances between 0.4 and 1.5 m which are typical for work at a desk.

The concept according to this invention of using as a base a multifocal lens with a segment which has a progressive surface has a number of surprising advantages:

As the progressive surface of the segment only has to possess the actual reading portion and the progressive area, these surface parts can be designed a lot more freely than when a completely progressive surface is used which possesses a distance portion, a progressive area and a reading portion.

In particular, the invention made it possible, when calculating the progressive surface of the segment, to work from the premise that a progressive surface must in all cases show a certain astigmatism which not only can be distributed more or less uniformly over the whole surface—as, for example, in the state of the art represented in DE AS No. 20 44 639—but which can also be transposed into a certain part of the progressive surface. This surface sector, into which the astigmatism of the progressive surface used is transposed, is, in the multifocal lens in accordance with this invention, advantageously in the distance portion which is, after all, not used for the segment. In this way, it becomes possible to design the progressive surface section which is used for the segment in such a way that the progressive area is relatively wide and largely free of astigmatism, i.e. which permits clear vision in the intermediate area. Furthermore, a reading portion is obtained which is large and practically free of astigmatism and which can have a practically constant power.

In addition to this surprising possibility of being able to realise a largely astigmatism-free transition area and a large reading portion in one part of a progressive surface, the multifocal lens in accordance with this invention has a number of other surprising advantages:

The distortion effect of the progressive surface designed in accordance with the present invention is very low in the progressive area too.

Whereas the segment cannot be made too large in the spectacle lens known from EU patent No. 39 284 (as otherwise the overlapping of the two surfaces, i.e. the step between the two surface parts, would be too large), the concept in accordance with this invention permits an extremely large segment without the overlapping of the two surfaces becoming too large. In the spectacle lens in accordance with this invention segments with a width of up to 45 mm and a height of up to 25 mm possible without difficulty, even when the progressive surface in accordance with one variation of the invention is located on the front surface or the surface on the ocular side. The overlap of the two surfaces is still only a few tenths of a millimeter at a maximum so that the edge between the single surface parts is hardly visible.

Nevertheless, it is possible without difficulty to "imbed" the progressive surface into the main surface in accordance with another variation of the invention in such a way that the prismatic power of the spectacle lens in the upper rim area of the segment and the prismatic power in the area of the main portion bordering on this are essentially equal so that practically no image jump is ensured. Furthermore, it is even possible to imbed the progressive surface into the main surface with only minimum overlapping in such a way that the tangential plane of the upper rim of the segment on the main meridian is equal to the tangential plane of the bordering point of the main part.

The surface focal power of the segment can, in this design, increase continually from the value of the surface focal power of the main lens to the surface focal power of the actual reading portion. It is, however, of particular advantage, if in accordance with one aspect of the invention, the progression begins with a larger focal power than that of the main lens. This has the advantage that with a progressive surface with a comparatively low actual progression increase, substantially higher addition can be obtained. The amount of aberration, particularly in the progressive area, is, however, roughly proportional to the addition so that the aberration of the lens in accordance with this invention can be further reduced, as with a lower addition, which determines the aberration, a larger actual power difference is obtained.

Calculating the surfaces can be done in a way known per se using Spline functions where advantageously first the progressive area is optimised without paying any attention to the surface properties of the distance portion and/or the reading portion.

It is, however, particularly advantageous—both with regard to the surface properies and with regard to the simplicity of the calculation—to use periodic functions such as are described in DE-OS No. 28 14 916. In those cases where terms or calculation methods are not described in detail here, explicit reference is made to this publication being thus herein incorporated by reference.

Furthermore, the progressive spectacle lens in accordance with the present invention can, without difficulty, be designed in such a way that in the progressive area the lines of constant power are largely horizontal. With regard to the advantages of this course for the lines of constant power in a lens with two progressive surfaces or for the lines of constant surface focal power, reference is made to DE-AS No. 26 10 203.

BRIEF DESCRIPTION OF THE DRAWING

The present invention is described below in detail an example with reference being made to the drawing in which:

FIG. 2 presents in chart form the sagitta and horizontal curvature radii of a progressive surface which is used the segment designed in accordance with the present invention.

DESCRIPTION OF A PREFERRED EMBODIMENT

Figure 1:
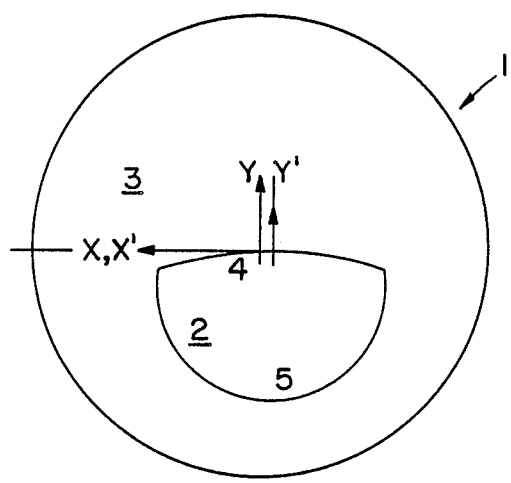
FIG. 1 shows a top view of a spectacle lens in accordance with this invention, and illustrating the axes x, x' and y, y' and wherein the z-axis (not shown) is understood to be normal to the sheet.

To explain the construction principle of a multifocal lens in accordance with this invention, FIG. 1 shows a top view of such a lens. The spectacle lens in accordance with this invention possesses a convex front surface 1 and a concave back surface which can, for example, be spherical, toric or atoric. In the front surface 1 there is a segment 2 which has been fixed into the main lens in the usual manner with multifocal lenses. For example, with a spectacle lens manufactured of "mineral glass" the segment 2 can be fused into position; with a spectacle lens made from synthetic material it is also possible to use a casting mold in which the surface of the segment 2 has been shaped accordingly.

The front surface of the segment 2 is a part of a progressive surface, i.e. the surface focal power of this surface increases from its upper area 4 to its lower part or area 5. The surface focal power of the main lens 3 is essentially constant. The surface of the main lens 3 may be spherical, or if necessary to correct peripheral aberration, aspheric.

Furthermore, in FIG. 1 the position of a Cartesian coordinate system for a spectacle lens is drawn in, having axes x, x' and y, y'.

The surface focal power of the main lens 3 has been calculated in such a way that in connection with the surface focal power of the concave back surface it provides the power required by the individual spectacle wearer for distance vision. The surface focal power of the lower part 5, i.e. of the actual reading portion of the spectacle lens, has been calculated in such a way that in connection with the concave back surface it produces the power required for near vision. The difference between the two focal powers is normally called the addition of the spectacle lens. In the area 4, i.e. the progression area of the segment 2, the surface focal power increases continually to the essentially constant value of the reading portion 5. In the upper rim area of the progression area 4 the surface power may be equal to that of the main lens 3 or greater than that of the main lens 3.

Below, a numerical version example of the present invention is presented in conjunction with FIGS. 2 to 6.

FIG. 2 shows a chart whose lefthand side shows the sagitta p for surface points (x,y) of the progressive surface, part of which is used for the segment. Here, sagitta means the distance of a surface point (x,y) from the vertex point measured in the z direction.

The surface focal power of the progressive surface shown numerically in FIG. 2 increases on the main meridian from 5.56 D to 7.56 D, i.e. the so-called addition A is 2.0 D. The refractive index of the multifocal lens is 1.525.

The calculation of the surface was done with the formulae given in DE-OS No. 28 14 916.

On the righthand side of the chart there are given the horizontal curvature radii, i.e. the curvature radii of the intersecting lines which are produced by the intersection of the plane parallel to the x/z plane with the progressive surface 1, for these surface points. As can be seen, the behavior of the curvature radii is exactly opposite to that, which is, for example, given in DE-OS No. 20 44 639.

In the version example shown, the main meridian of the progressive surface is rectilinear and is positioned in the surface center (x'=0). In addition, the main meridian is an umbilical line.

Figure 3:
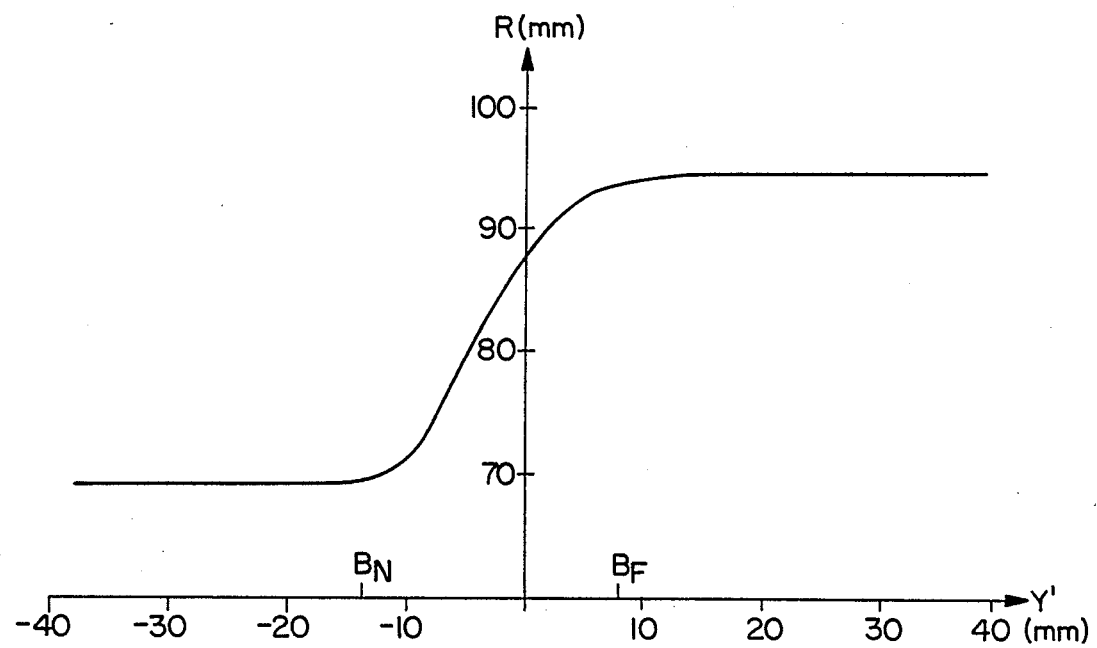
FIG. 3 shows the course of the main meridian of the surface given in FIG. 2.

FIG. 3 shows the dependence of the curvature radius R of the main meridian on y for the version example shown. As can be seen, the surface focal power on the main meridian is practically constant in the distance portion and in the reading portion, and increases in the progression area predominantly linearly from the value of the distance portion to that of the reading portion.

Figure 4:
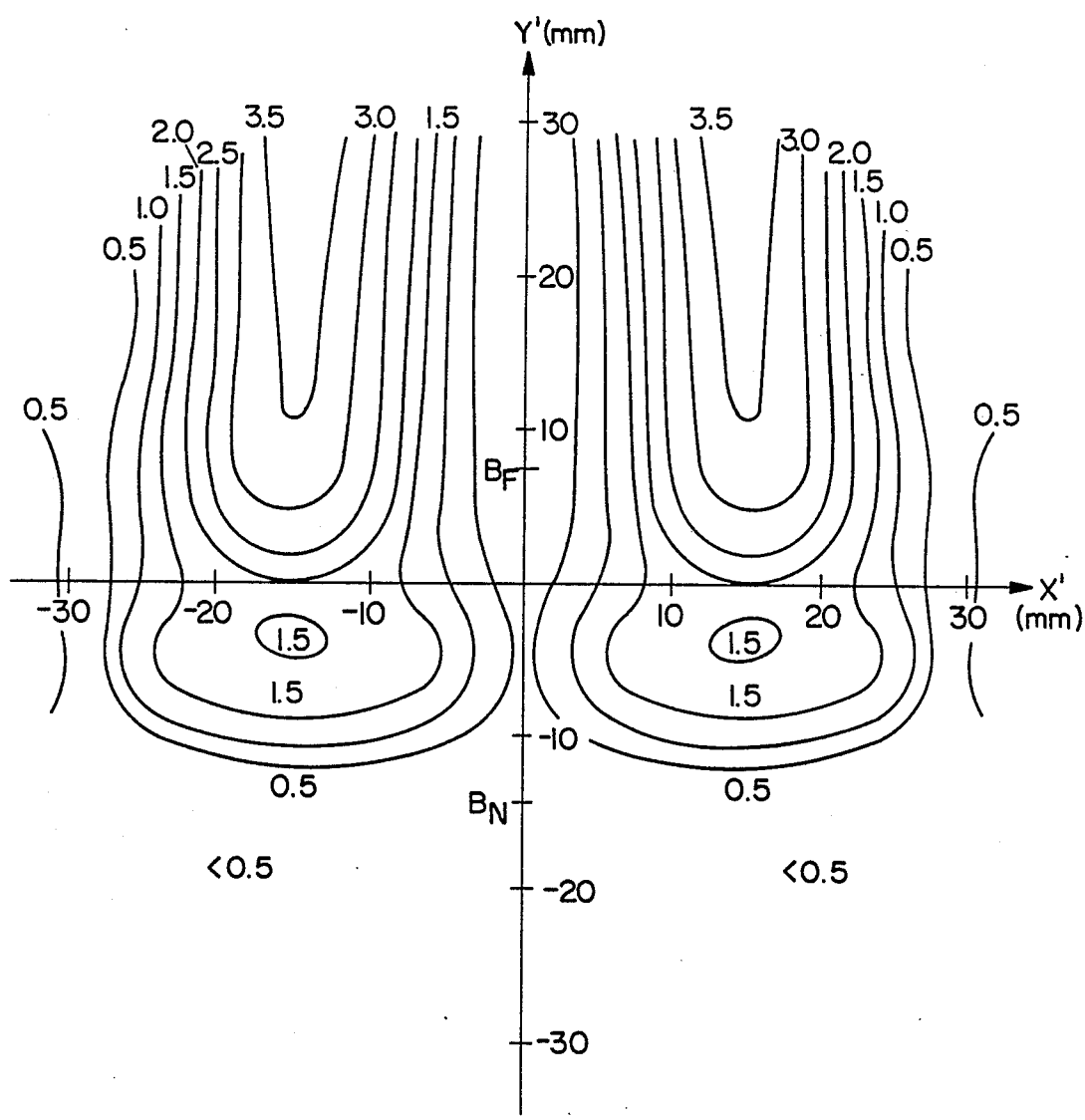
FIG. 4 shows the surface astigmatism of the progressive surface used in part.

FIG. 4 shows the surface astigmatism of the front surface in accordance with FIG. 2. As can be seen, the surface astigmatism is very high outside the main meridian, particularly in the distance portion. In the progression area extending approximately from $y=+6$ to $y=-14$ mm the surface astigmatism is comparatively low and very low, i.e. less than 0.5 D, in the large reading portion.

Figure 5:
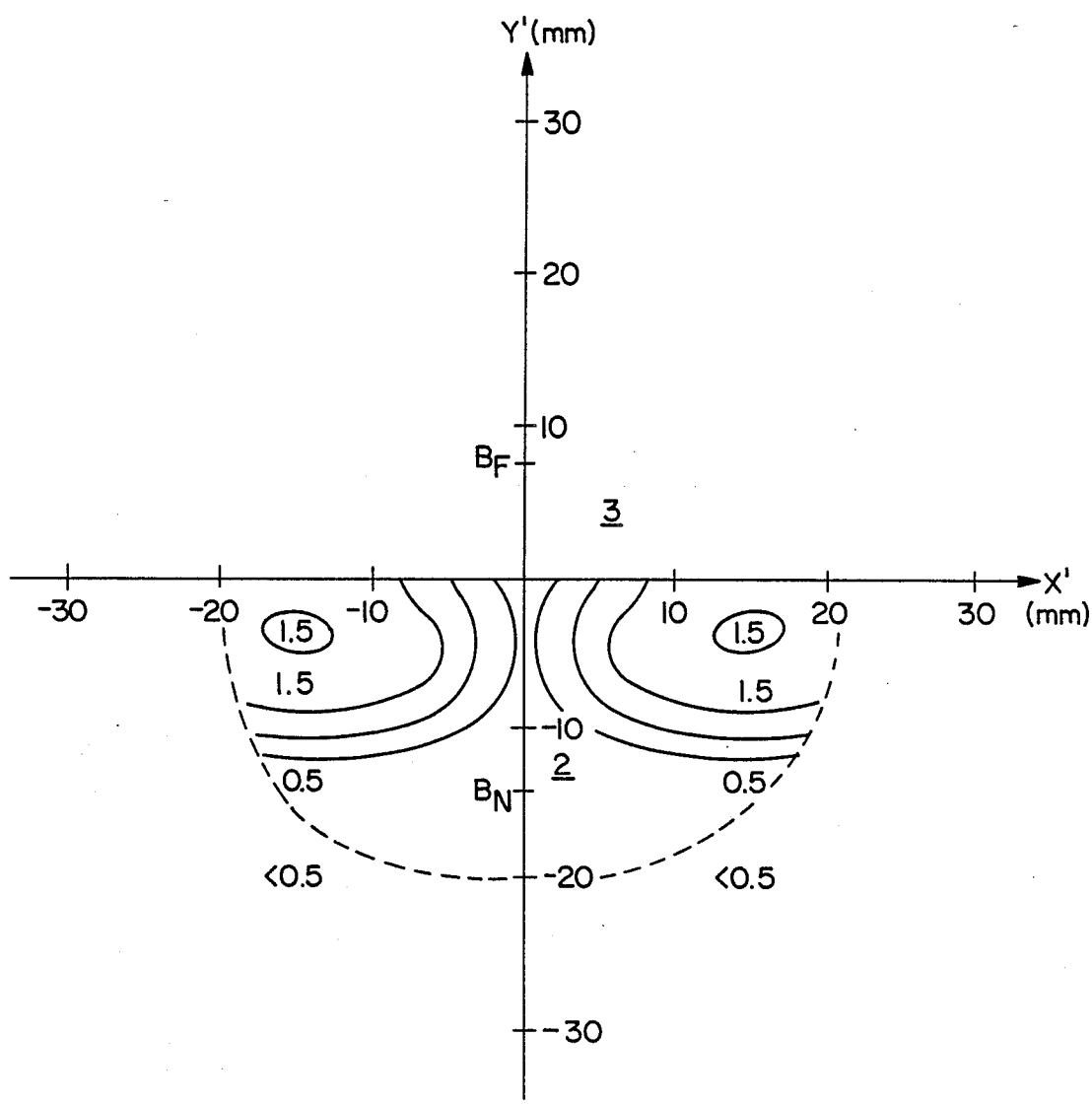
FIG. 5 shows lines of equal astigmatism for the progressive surface in accordance with FIG. 2.
Figure 6:
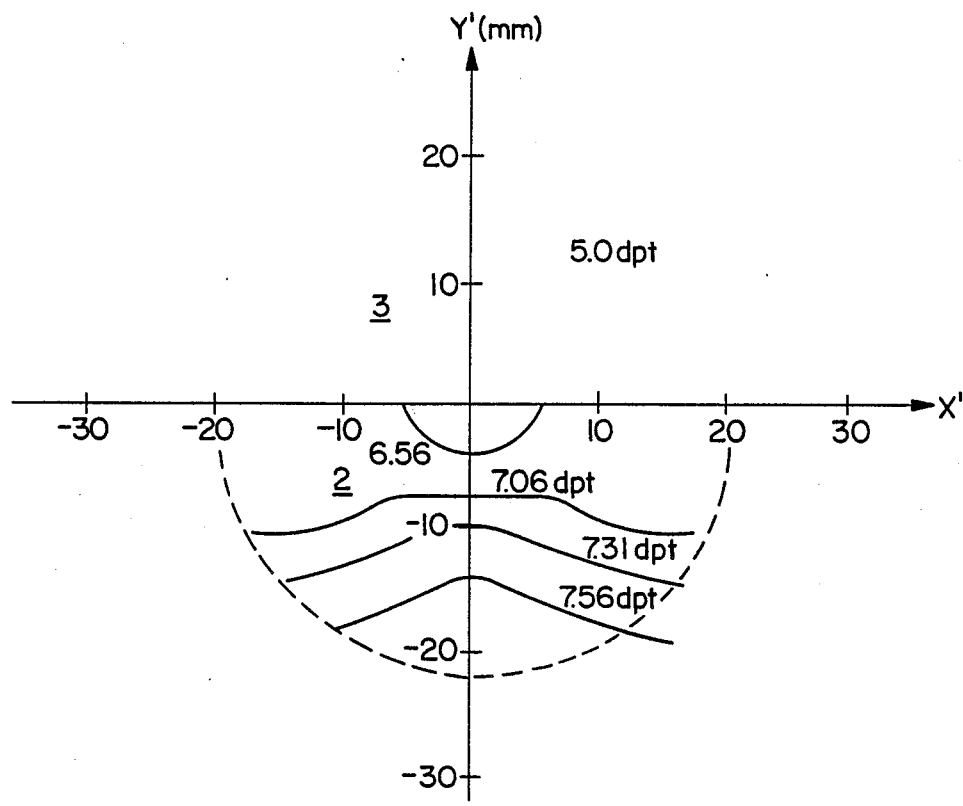
FIG. 6 shows the power lines of a spectacle lens in accordance with the present invention where the surface shown in FIG. 2 is used for the segment.

$B_F$ and $B_N$ in FIGS. 4 to 6 are respectively the distance reference point and the near reference point.

A part of the progressive surface described above is used for the exterior surface of the segment. In the version example shown the following relationships exist between the coordinate systems for the spectacle lens (x,y) and the coordinate system of the progressive surface (x', y'):

(*)

$$x = x' +/- 2 \text{ mm}$$

$$y = y'$$

The two signs shown apply respectively for the left and right spectacle lenses. The segment 2 has the dimensions given in FIG. 2, i.e. the width of the segment is 40 mm while the height of the segment is 25 mm. It is explicitly pointed out here that these dimensions are meant only as examples and that it is possible at any time to use larger segments, too.

This simple relationship between the two coordinate systems is possible due to the fact that the progressive corridor of the progressive surface used for the segment in accordance with the present invention is extremely wide in comparison to the progressive corridors of known progressive surfaces. For this reason, it is not necessary to rotate the progressive surface during fitting.

The surface focal power of the main lens may be 5.56 D so that the addition of the multifocal lens in accordance with this invention is equal to the addition of the progressive surface used in part. The power of the main lens may, however, also be lower, for example 5.0 D so that the focal power jump between the main lens and the upper rim of the segment will be about 1 D and so will be within the order of the residual accommodation capability of presbyopes. Thanks to the combination of the progression area and the reading portions of a progressive surface with a main lens whose surface focal power is smaller than that of the distance portion of the progressive surface the advantage is obtained that the aberration in the progression area and in the reading portion caused by the addition of the progressive surface can be reduced while the actual addition remains the same.

FIG. 5 shows the total astigmatism for a progressive surface of a multifocal lens in accordance with the present invention.

As FIG. 5 shows, the distance portion 3 and the reading portion 5 of the multifocal lens are largely free of astigmatism, i.e. the total astigmatism in the reading portion is less than 0.5 D. It is true that a certain residual astigmatism is still present in the progression area; however, that part of the progression area in which the astigmatism along the main meridian is less than 1 D is with about 8 mm comparatively wide.

Furthermore, the course of the power lines is—as FIG. 6 shows—very favorable as these are practically horizontal, in particular in the area of the main meridian. FIG. 6 shows the case where the progressive surface has a distance portion power of 5.56 D and a near portion power of 7.56 D while the surface focal power of the main lens is 5.0 D.

Above, one version example of the present invention has been described. In the version example shown, a progressive surface has been used for the segment whose main meridian is plane and has the form of an umbilical line. It is, of course, also possible to use a progressive surface for the segment 2, whose main meridian is winding and/or does not have the form of an umbilical line but which does show a certain residual astigmatism at least on a part of the main meridian.

The multifocal lens in accordance with the present invention can also have a different form of the segment. The relationship (x) should be understood only as one example; if necessary, other relationships between the coordinate system of the progressive surface and that of the multifocal lens can be selected: for example, a transportation or rotation of the y-axes may be selected; however, in most cases it will not be necessary to rotate the lens during fitting due to the special properties of the surface in accordance with this invention.

Furthermore, it is also possible to design the segment in the back surface or to designe the fusion surface of an additional segment in a progressive manner. In this case, the surface data of the fusion surface are to be calculated for the difference of the higher refractive index of the segment to that of the main lens.

Of course, the course of the main meridian may also be different to that shown in FIG. 3: For example, it is possible to use a main meridian whose curvature shows extreme values in which umbilical lines run perpendicular to the main meridian.

The material used for the multifocal lens in accordance with the present invention may be mineral glass, organic materials or materials with refractive index gradients.

The manufacturing can be done in a manner known per se and so need not be gone into in detail here.

Accordingly, it is seen that there is advantageously provided a multifocal lens having an axially symmetrical front surface and a rear surface defining a main portion for distant vision and further includes an additional near segment for near vision. The near segment is provided in the front surface. The front surface has surface focal power which is essentially constant in the main part but which increases progressively over a progressive surface within said near segment from an upper part thereof to a lower area thereof to provide a progressive zone or corridor, the lens in said progressive corridor having radii of curvature of lines of intersection of plains orthogonal to a main meridian of the lens which decrease on the front surface, at least in an area surrounding the main meridian, in proportion to increasing distance from the main meridian, and so providing a very wide progressive zone or corridor. Alternatively, the near segment may be provided in the rear surface, which faces the eye of the wearer, in which case such radii of curvature increase, rather than decrease, at least in an area surrounding the main meridian.

Preferably, within the progressive corridor surface astigmatism is minimalized such that surface astigmatism is essentially concentrated in the main portion for distant vision. The near segment is preferably fused into the lens over a fusion surface, the progressive surface being the fusion surface. It is preferred that the upper area of the near segment have a prismatic power which is substantially the same as the prismatic power in a region of the main portion bordering the upper area, and that the main meridian provide transition between the upper area of the near segment and the main portion without any break ("knick"). In the upper area of the near segment, the lens may have focal power which is greater than the focal power in the main portion. The near segment provides a focal power addition, the lens having in the upper area of the near segment a focal power which may be about one-third of said focal power addition, the near segment having a substantially constant focal power in the lower area thereof. The near segment may be of approximately spherical design in the lower area thereof.

A multifocal ophthalmological lens thereby comprises a front surface facing away from the eye and a rear surface facing toward the eye, the lens having a main portion designed for distant vision and an added portion constituting a near segment designed for near vision, at least one surface of the added portion being composed of a progressive zone having at least one progressive surface in which the refractive power increases, the main portion and the near segment are separated by transition lines, on which transition lines the surface is not twice continuously differentiable, the lens having a main meridian. The lens further comprises the following features:

the refractive power of the main portion is constant except for possible aspheric corrections of peripheral abberations, and the progressive surface of the added portion is formed in such manner that, for the progressive surface in which the refractive power increases, the radius of curvature of the intersecting lines of planes orthogonal to the main meridian in the entire portion of the surface;

a. decreases, with increasing distance from the main meridian at least in a region surrounding the main meridian, if the progressive surface is the front surface of the lens, or b. increases, with increasing distance from the main meridian at least in a region surrounding the main meridian, if the progressive surface is the rear surface of the lens.

We claim:

1. A multifocal ophthalmological lens comprising a front surface facing away from the eye and a rear surface facing toward the eye, the lens having a main portion designed for distance vision and an added portion constituting a near segment designed for near vision, at least one surface of the added portion being composed of a progressive zone having at least one progressive surface in which the refractive power increases, the main portion and the near segment are separated by transition lines, on which transition lines the surface is not twice continuously differentiable, the lens having a main meridian and further comprising the following features:

the refractive power of the main portion being constant except for possible aspheric corrections of peripheral abberations, and the progressive surface of the added portion being formed in such manner that, for the progressive surface in which the refractive power increases, the radius of curvature of the intersecting lines of planes orthogonal to the main meridian in the entire portion of the surface decreases, with increasing distance from the main meridian at least in a region surrounding the main meridian, if the progressive surface is the front surface of the lens, or increases, with increasing distance from the main meridian at least in a region surrounding the main meridian, if the progressive surface is the rear surface of the lens.

2. A multifocal lens according to claim 1, wherein the added portion has an upper peripheral area, and the main portion has an area adjacent to the added portion, the prismatic power being essentially the same in the upper peripheral area of the added portion and the adjacent area of the main portion.

3. A multifocal lens according to claim 1 wherein the main meridian within the added portion transcends smoothly into an upper peripheral region of the main portion.

4. A multifocal lens according to one of the claims 1 wherein the focal power of the lens is greater in an upper peripheral area of the added portion than the focal power of the main portion.

5. A multifocal lens according to the claim 1 wherein the focal power of the lens is greater in an upper peripheral area of the added portion than the focal power of the main portion.

6. A multifocal lens according to claim 5, wherein the focal power of the multifocal lens in the upper peripheral region of the added portion is greater by approximately one-third of the focal power addition over the main portion.

7. A multifocal lens according to claim 1 wherein the added portion has a practically constant focal power in its lower region.

8. A multifocal lens according to claim 7 wherein the added portion has a region having a practically constant focal power in which region the added portion is of approximately spherical design.

* * * * *

UNITED STATES PATENT AND TRADEMARK OFFICE
CERTIFICATE OF CORRECTION

PATENT NO. : 4,955,712

DATED : September 11, 1990

INVENTOR(S) : Barth et al

It is certified that error appears in the above-identified patent and that said Letters Patent is hereby corrected as shown below:

Col. 9, li. 13, replace "distance" with --distant--; and li. 26, replace "surface" with --surface(s)--;

Col. 10, li. 19, delete "the".

Signed and Sealed this

Eleventh Day of February, 1992

Attest:

HARRY F. MANBECK, JR.

*Attesting Officer*       *Commissioner of Patents and Trademarks*